(12) United States Patent
Minagata et al.

(10) Patent No.: US 9,755,219 B2
(45) Date of Patent: Sep. 5, 2017

(54) ELECTRICAL STORAGE APPARATUS (71) Applicant: KABUSHIKI KAISHA TOYOTA JIDOSHOKKI, Kariya-shi, Aichi-ken (JP)

(72) Inventors: Atsushi Minagata, Kariya (JP); Motoaki Okuda, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 219 days.

(21) Appl. No.: 14/779,740

(22) PCT Filed: Feb. 28, 2014

(86) PCT No.: PCT/JP2014/055127
§ 371 (c)(1),
(2) Date: Sep. 24, 2015

(87) PCT Pub. No.: WO2014/156474
PCT Pub. Date: Oct. 2, 2014

(65) Prior Publication Data
US 2016/0056445 A1  Feb. 25, 2016

(30) Foreign Application Priority Data
Mar. 29, 2013  (JP) .................. 2013-073816

(51) Int. Cl.
*H01M 2/36* (2006.01)
*H01M 2/02* (2006.01)
(Continued)

(52) U.S. Cl.
CPC ........... *H01M 2/362* (2013.01); *H01M 2/021* (2013.01); *H01M 2/024* (2013.01);
(Continued)

(58) Field of Classification Search
CPC .. H01M 2/021; H01M 2/0217; H01M 2/0275; H01M 2/362
(Continued)

(56) References Cited

U.S. PATENT DOCUMENTS

| | | | |
|---|---|---|---|
| 2011/0183181 A1 | 7/2011 | Moon et al. | |
| 2011/0206976 A1* | 8/2011 | Yoo | H01M 2/1061 429/153 |

(Continued)

FOREIGN PATENT DOCUMENTS

| | | |
|---|---|---|
| CN | 102136564 A | 7/2011 |
| JP | 2001-110692 A | 4/2001 |

(Continued)

OTHER PUBLICATIONS

International Preliminary Report on Patentability dated Sep. 29, 2015 from the International Searching Authority in counterpart International Application No. PCT/JP2014/055127.

(Continued)

*Primary Examiner* — Basia Ridley
*Assistant Examiner* — James Erwin
(74) *Attorney, Agent, or Firm* — Sughrue Mion, PLLC (57) ABSTRACT

An electricity storage device includes an electrode assembly having primary electrodes and secondary electrodes, a case having a wall with an inlet, and an insulator. The electrode assembly has a facing surface facing the wall of the case. The primary electrodes have primary tabs protruding from one edge. The second electrodes have secondary tabs. The group of primary tabs and the group of secondary tabs each have a first side and a second side on the opposite sides. In each of the group of primary tabs and the group of secondary tabs, the first side faces the facing surface, and the second side is bent to face the wall of the case. The inlet is located at a position sandwiched regions of the wall onto which the (Continued)

primary tab group and the secondary tab group are projected when the wall is viewed from a direction perpendicular to the facing surface.

6 Claims, 5 Drawing Sheets

(51) Int. Cl.
*H01M 2/14* (2006.01)
*H01M 2/26* (2006.01)
*H01M 10/04* (2006.01)
*H01M 10/02* (2006.01)

(52) U.S. Cl.
CPC ....... *H01M 2/0217* (2013.01); *H01M 2/0275* (2013.01); *H01M 2/14* (2013.01); *H01M 2/266* (2013.01); *H01M 10/02* (2013.01); *H01M 10/0413* (2013.01); *H01M 2220/20* (2013.01)

(58) Field of Classification Search
USPC .......................................................... 429/153
See application file for complete search history.

(56) References Cited

U.S. PATENT DOCUMENTS

| 2012/0171525 A1* | 7/2012 | Guen | ................... H01M 2/0275 429/53 |
| 2012/0177961 A1* | 7/2012 | Lee | ..................... H01M 2/0285 429/82 |

FOREIGN PATENT DOCUMENTS

| JP | 2002-270218 A | 9/2002 |
| JP | 2003-229112 A | 8/2003 |
| JP | 2012-014935 A | 1/2012 |
| JP | 2014-026867 A | 2/2014 |
| WO | 2012/140716 A1 | 10/2012 |

OTHER PUBLICATIONS

Communication dated Oct. 10, 2016, issued by the State Intellectual Property Office of the P.R.C. in corresponding Chinese Application No. 201480017530.5.
International Search Report for PCT/JP2014/055127 dated Apr. 15, 2014.

* cited by examiner

ELECTRICAL STORAGE APPARATUS

CROSS REFERENCE TO RELATED APPLICATIONS

This application is a National Stage of International Application No. PCT/JP2014/055127filed Feb. 28, 2014, claiming priority based on Japanese Patent Application No. 2013-073816, filed Mar. 29, 2013, the contents of all of which are incorporated herein by reference in their entirety.

TECHNICAL FIELD

The present invention relates to an electricity storage device that includes a case having an inlet for an electrolyte solution in a wall.

BACKGROUND ART

Figure 9:
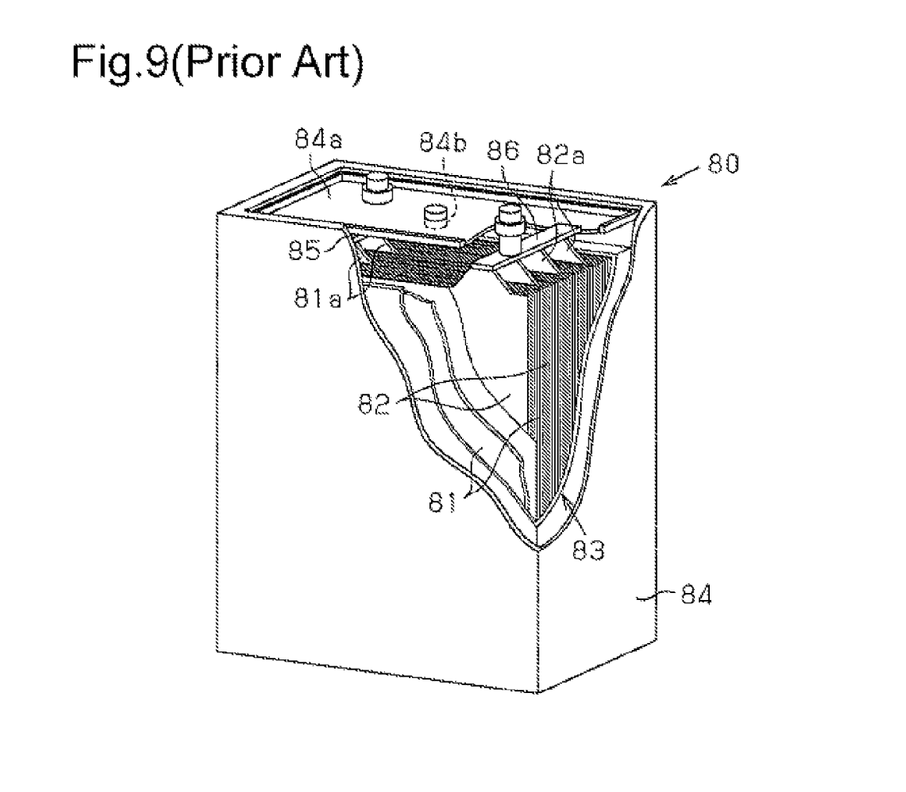
FIG. 9 is a diagram showing background art.

Electric vehicles (EVs) and plug-in hybrid vehicles (PHVs) are equipped with rechargeable batteries, which are electricity storage devices that store electric power for drive motors. As shown in FIG. 9, a rechargeable battery 80 includes an electrode assembly 83 and a case 84, which accommodates the electrode assembly 83. The electrode assembly 83 includes positive electrodes 81 and negative electrodes 82, which are layered alternately. The positive electrodes 81 are insulated from the negative electrodes 82. Each of the positive and negative electrodes 81 and 82 includes metal foil and an active material applied to the opposite sides of the metal foil. A positive electrode tab 81a is located at one edge of each positive electrode 81. A negative electrode tab 82a is located at one edge of each negative electrode 82. The rechargeable battery 80 also includes a positive conductor 85, which is connected to the positive electrode tabs 81a, and a negative conductor 86, which is connected to the negative electrode tabs 82a. The case 84 includes a lid 84a, which includes an inlet 84b through which an electrolyte solution is introduced into the case 84. For example, Patent Document 1 describes such a structure.

PRIOR ART DOCUMENTS

Patent Documents

Patent Document 1: Japanese Laid-Open Patent Publication No. 2003-229112

SUMMARY OF THE INVENTION

Problems that the Invention is to Solve

In manufacturing a rechargeable battery, an electrolyte solution is introduced into a case through an inlet so that active materials are immersed in the electrolyte solution in the case. However, immersing the active material in the electrolyte solution is time-consuming.

It is an objective of the present disclosure to provide an electricity storage device that achieves effective immersion of an active material in an electrolyte solution.

Means for Solving the Problems

To achieve the foregoing objective and in accordance with one aspect of the present invention, an electricity storage device is provided that includes an electrode assembly, a case, and an insulator. The electrode assembly includes a plurality of primary electrodes and a plurality of secondary electrodes. The primary electrodes and the secondary electrodes are layered alternately in a lamination direction. The primary electrodes are insulated from the secondary electrodes. Each of the primary electrodes and the secondary electrodes includes metal foil and an active material layer that is located on at least one surface of the metal foil. The case accommodates electrolyte solution and the electrode assembly and includes a wall that includes an inlet for the electrolyte solution. The insulator is located in the case and insulates the electrode assembly from the case. The electrode assembly includes a facing surface that faces the wall of the case. At least some of the primary electrodes each include a primary tab that projects from one edge of the primary electrode to take out electricity from the primary electrode. At least some of the secondary electrodes each include a secondary tab that projects from one edge of the secondary electrode to take out electricity from the secondary electrode. The primary tabs are collected in the lamination direction to form a primary tab group on the facing surface of the electrode assembly. The secondary tabs are collected in the lamination direction to form a secondary tab group on the facing surface of the electrode assembly. The primary tab group and the secondary tab group each include a first side and a second side opposite to the first side. The primary tab group and the secondary tab group are spaced apart from each other in a direction that extends perpendicular to the lamination direction and along the facing surface of the electrode assembly. Each of the primary tab group and the secondary tab group is bent such that the first side faces the facing surface of the electrode assembly and the second side faces the wall of the case. The insulator exposes the entire facing surface of the electrode assembly to an outside of the insulator. The inlet is located at a position between regions of the wall onto which the primary tab group and the secondary tab group are projected when the wall is viewed in a direction perpendicular to the facing surface of the electrode assembly.

MODES FOR CARRYING OUT THE INVENTION

Referring to FIGS. 1 to 7, one embodiment of a rechargeable battery, which serves as an electricity storage device, will now be described.

Figure 1:
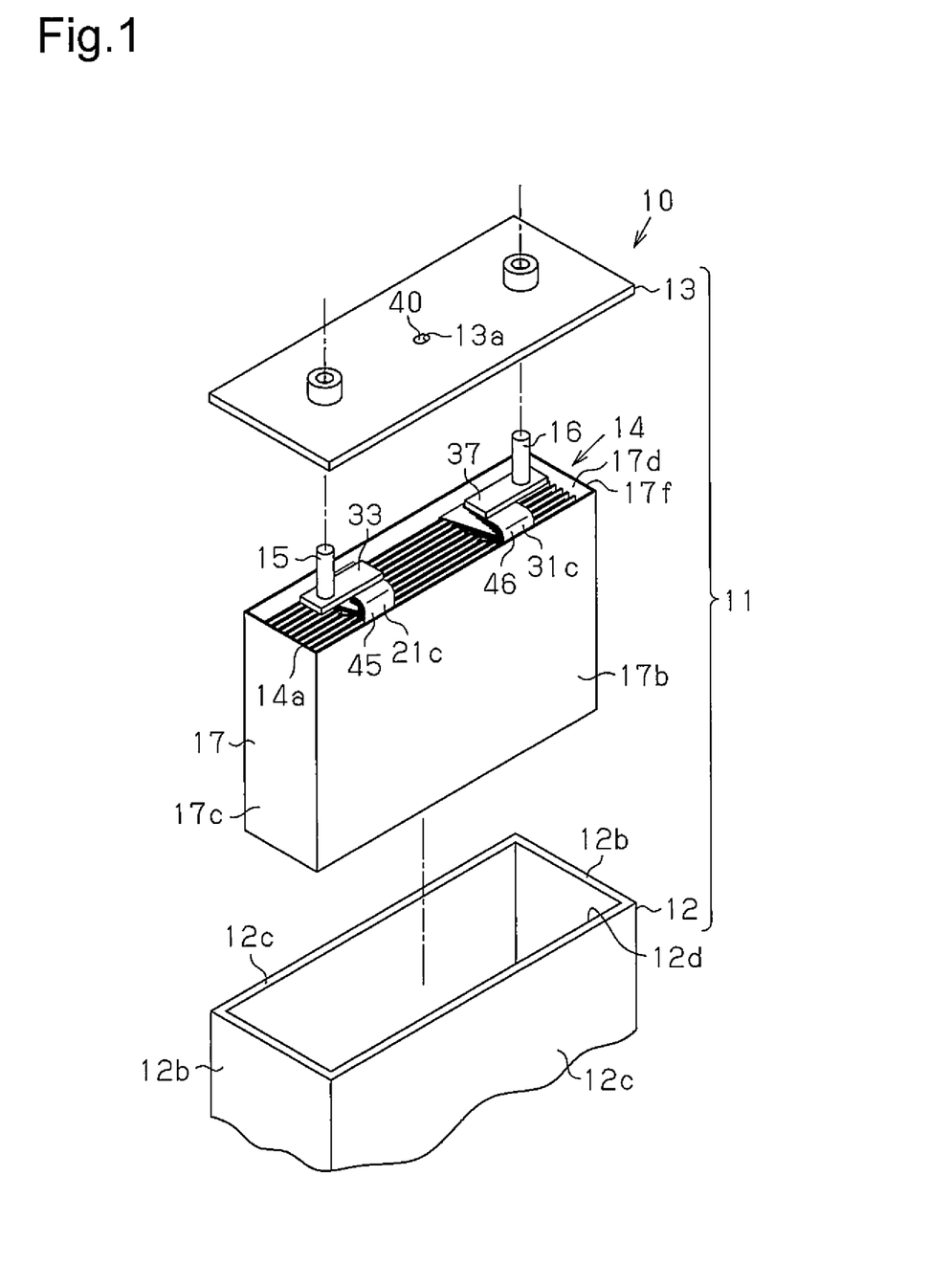
FIG. 1 is an exploded perspective view showing a rechargeable battery.
Figure 2:
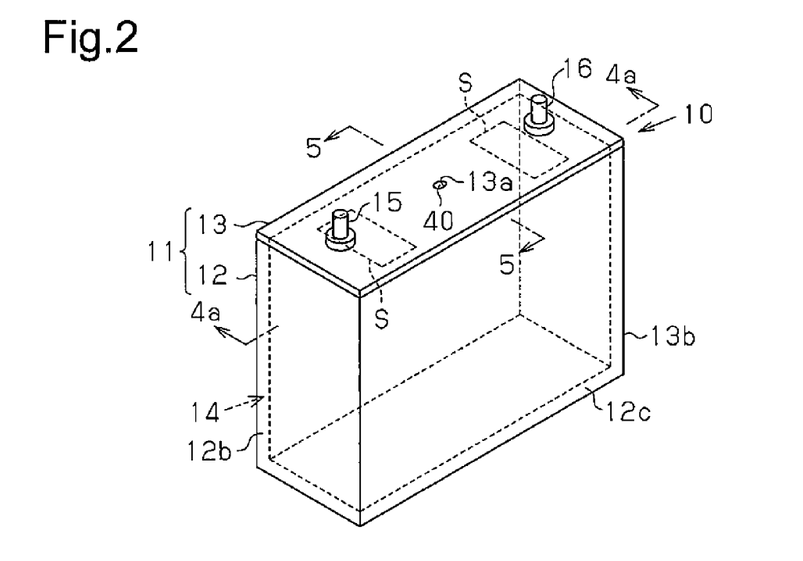
FIG. 2 is a perspective view showing the appearance of the rechargeable battery of FIG. 1.
Figures 4A, 4B:
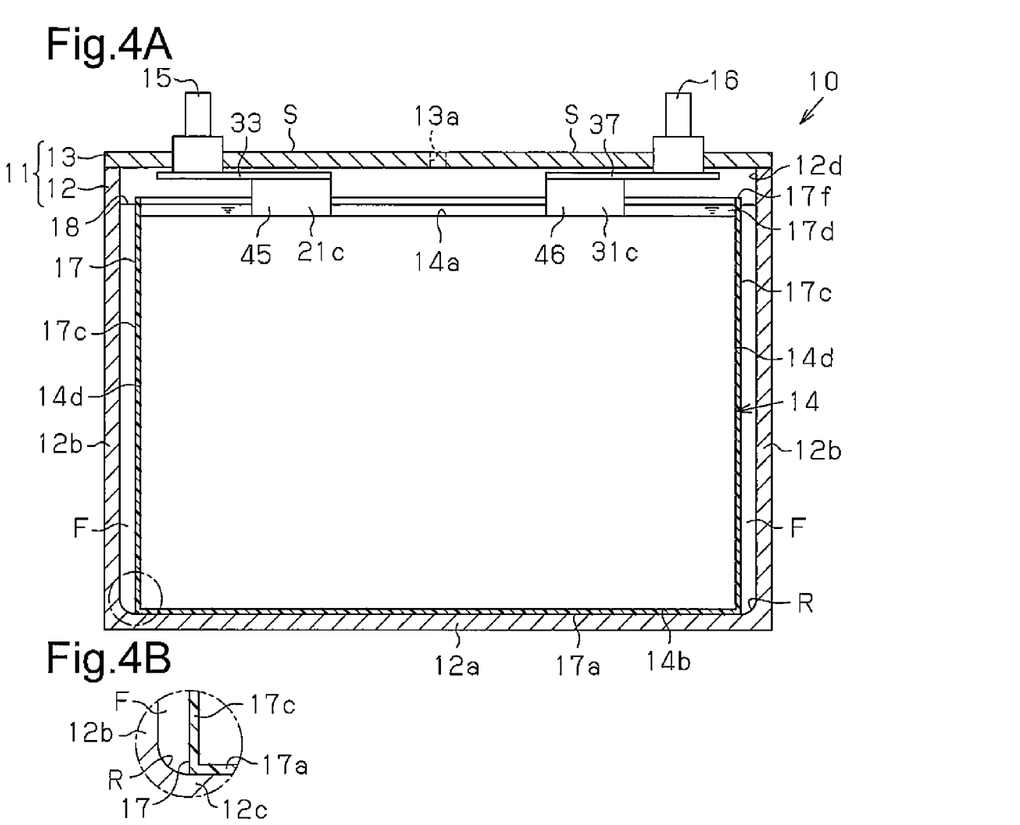
FIG. 4A is a cross-sectional view taken along line 4a-4a in FIG. 2.
FIG. 4B is an enlarged cross-sectional view showing a curved section near the bottom plate of a case.

As shown in FIGS. 1, 2 and 4A, a rechargeable battery 10 includes an electrode assembly 14, which serves as a charging and discharging element, and an electrolyte solution 18, which serves as an electrolyte, and a case 11, which accommodates the electrode assembly 14 and the electrolyte solution 18. The case 11 includes a box-shaped body 12, which has a bottom, and a lid 13, which has the shape of a rectangular flat plate. The lid 13 is laser welded to the body 12. The body 12 includes a rectangular bottom plate 12a, transverse walls 12b, which project from two opposite transverse edges of the bottom plate 12a, and longitudinal walls 12c, which project from the two opposite longitudinal edges of the bottom plate 12a. The body 12 includes an insertion hole 12d for inserting the electrode assembly 14. The inner corners formed by the transverse walls 12b and the bottom plate 12a in the inner surface of the body 12 are curved sections R, which have arcuate cross-sections. The body 12 and the lid 13 are made of metal (e.g., stainless steel or aluminum), and the lid 13 closes the insertion hole 12d.

The rechargeable battery 10 of the present embodiment is a prismatic lithium-ion battery having a rectangular outer shape. The electrode assembly 14 is electrically connected to a positive terminal 15 and a negative terminal 16, which take out electricity from the electrode assembly 14. The positive and negative terminals 15 and 16 project out of the case 11 through the lid 13.

Figure 3:
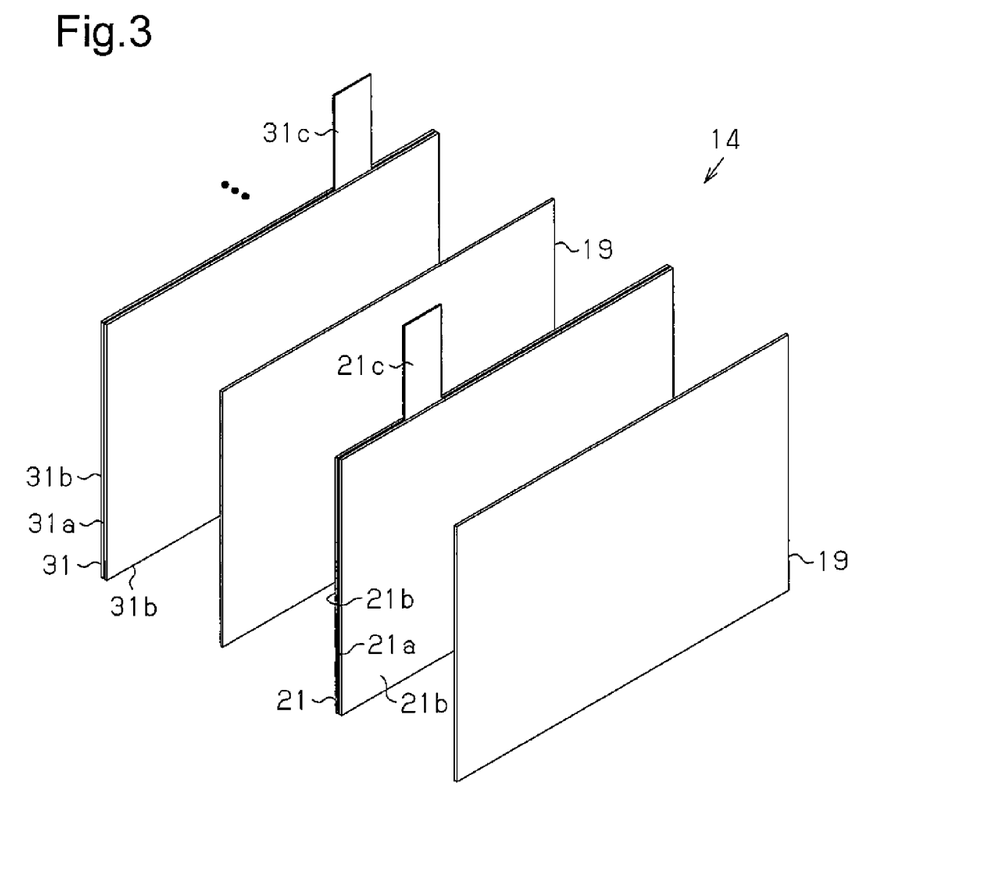
FIG. 3 is a perspective view showing components of an electrode assembly.

As shown in FIG. 3, the electrode assembly 14 is formed by alternately layering positive electrode sheets 21, which serve as primary electrodes, and negative electrode sheets 31, which serve as secondary electrodes. In the following descriptions, the direction in which the positive electrode sheets 21 and the negative electrode sheets 31 are layered is referred to as the lamination direction. A separator 19 is located between each positive electrode sheet 21 and the corresponding negative electrode sheet 31 to insulate the sheets from each other. Each positive electrode sheet 21 includes rectangular positive metal foil 21a (aluminum foil in the present embodiment) and positive active material layers 21b located on opposite sides of the positive metal foil 21a. Each negative electrode sheet 31 includes rectangular negative metal foil 31a (copper foil in the present embodiment) and negative active material layers 31b located on opposite sides of the negative metal foil 31a.

A positive collector tab 21c, which serves as a primary tab, projects from one edge of each positive electrode sheet 21 (the edge facing the lid 13). The positive electrode sheets 21 are all identical in shape, and all the positive collector tabs 21c are collected and layered in the lamination direction. A negative collector tab 31c, which serves as a secondary tab, projects from one edge of each negative electrode sheet 31 (the edge facing the lid 13). The negative electrode sheets 31 are all identical in shape, and all the negative collector tabs 31c are collected and layered in the lamination direction.

Figure 5:
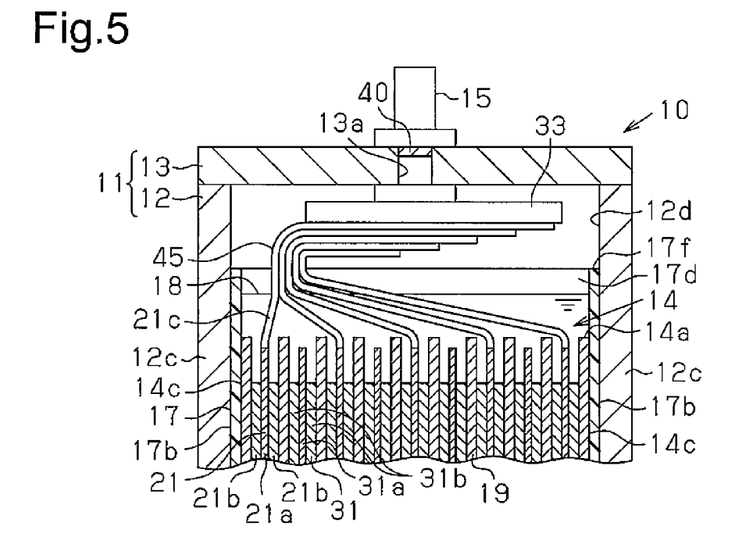
FIG. 5 is a cross-sectional view taken along line 5-5 in FIG. 2.

As shown in FIGS. 1 and 5, all the positive collector tabs 21c are collected near a first edge in the lamination direction of the electrode assembly 14 to form a positive tab group 45 and then bent toward a second edge in the lamination direction of the electrode assembly 14. The electrode assembly 14 includes a first surface 14a formed by the collection of one edge of each positive electrode sheet 21 and one edge of each negative electrode sheet 31. The first surface 14a serves as a facing surface, which faces the lid 13. The positive tab group 45 projects from the first surface 14a. The positive tab group 45 includes a first side and a second side opposite to the first side. The positive tab group 45 is bent such that the first side faces the first surface 14a of the electrode assembly 14 and the second side faces the lid 13. The second side of the positive tab group 45 is connected to a positive conductor 33, which is connected to a positive terminal 15.

All the negative collector tabs 31c are collected near the first edge of the electrode assembly 14 to form a negative tab group 46 and then bent toward the second edge of the electrode assembly 14. The negative tab group 46 projects from the first surface 14a of the electrode assembly 14. The negative tab group 46 includes a first side and a second side opposite to the first side. The negative tab group 46 is bent such that the first side faces the first surface 14a of the electrode assembly 14 and the second side faces the lid 13. The second side of the negative tab group 46 is connected to a negative conductor 37, which is connected to a negative terminal 16.

The positive collector tabs 21c and the negative collector tabs 31c are separately collected so that the positive collector tabs 21c are not in contact with the negative collector tabs 31c. The positive tab group 45 and the negative tab group 46 are spaced apart from each other in a direction that is perpendicular to the lamination direction and extends along the first surface 14a.

As shown in FIG. 4A, the body 12 accommodates a plastic insulator 17, which has the shape of a rectangular box. The electrode assembly 14 includes a second surface 14b, which is opposite to the first surface 14a. The insulator 17 includes a bottom covering section 17a, which insulates the second surface 14b of the electrode assembly 14 from the bottom plate 12a of the case 11. The electrode assembly 14 also includes two side surfaces 14d, which are perpendicular to the first surface 14a of the electrode assembly 14 and parallel to the lamination direction. The insulator 17 includes secondary covering sections 17c, which are located between the side surfaces 14d of the electrode assembly 14 and the transverse walls 12b of the body 12. As shown in FIG. 4B, the insulator 17 is placed on the bottom plate 12a such that the bottom covering section 17a is not located on the two curved sections R. The outer surfaces of the secondary covering sections 17c are spaced apart from the corresponding transverse walls 12b by clearances F.

As shown in FIG. 5, the electrode assembly 14 includes two end surfaces 14c, which are perpendicular to the first surface 14a and the lamination direction. The end surfaces 14c are located on opposite ends in the lamination direction of the electrode assembly 14. The insulator 17 includes primary covering sections 17b, which insulate the end surfaces 14c of the electrode assembly 14 from the longitudinal walls 12c of the body 12. The insulator 17 also includes an opening 17d for inserting the electrode assembly 14. The opening 17d exposes the entire first surface 14a of the electrode assembly 14 to the outside of the insulator 17. An open end 17f of the insulator 17 is located above the first surface 14a in the direction in which the positive collector tabs 21c and the negative collector tabs 31c project from the first surface 14a. That is, the primary covering sections 17b and the secondary covering sections 17c of the insulator 17 extend beyond the first surface 14a of the electrode assembly 14 in a direction perpendicular to the first surface 14a so that the first surface 14a is located at a position lower than the open end 17f of the insulator 17. There is virtually no space between the outer surfaces of the primary covering sections 17b and the corresponding longitudinal walls 12c.

As shown in FIGS. 1 and 2, the lid 13 includes an inlet 13a, which extends through the lid 13 in the thickness direction of the lid 13. Thus, in the present embodiment, the lid 13 functions as the wall of the case 11 that includes the inlet 13a. Referring to FIG. 2, two regions S defined by dotted lines are regions of the lid 13 onto which the positive tab group 45 and the negative tab group 46 are projected, in other words, regions overlapping with the positive tab group 45 and the negative tab group 46, when the lid 13 is viewed in a direction perpendicular to the first surface 14a. The inlet 13a is located between the two regions S.

As shown in FIGS. 1 and 4A, the inlet 13a does not face the positive tab group 45 or the negative tab group 46 but directly faces the first surface 14a of the electrode assembly 14. Further, the inlet 13a is located at the center in the longitudinal and transverse directions of the lid 13. That is, the inlet 13a is spaced apart from the two regions S by equal distances. A sealing member 40 seals the inlet 13a to prevent gas and the electrolyte solution 18 from leaking out of the case 11.

A method for manufacturing the rechargeable battery 10 and its operations will now be described.

First, the electrode assembly 14 is covered by the insulator 17 and then inserted, together with the insulator 17 and with the bottom covering section 17a entering first, into the body 12 through the insertion hole 12d. Then, the lid 13 is joined to the open end of the body 12 to close the insertion hole 12d, forming the case 11. The electrolyte solution 18 is then introduced into the case 11 through the inlet 13a. After the electrolyte solution 18 is introduced, the inlet 13a is sealed by the sealing member 40. The rechargeable battery 10 is thus assembled.

Figure 6:
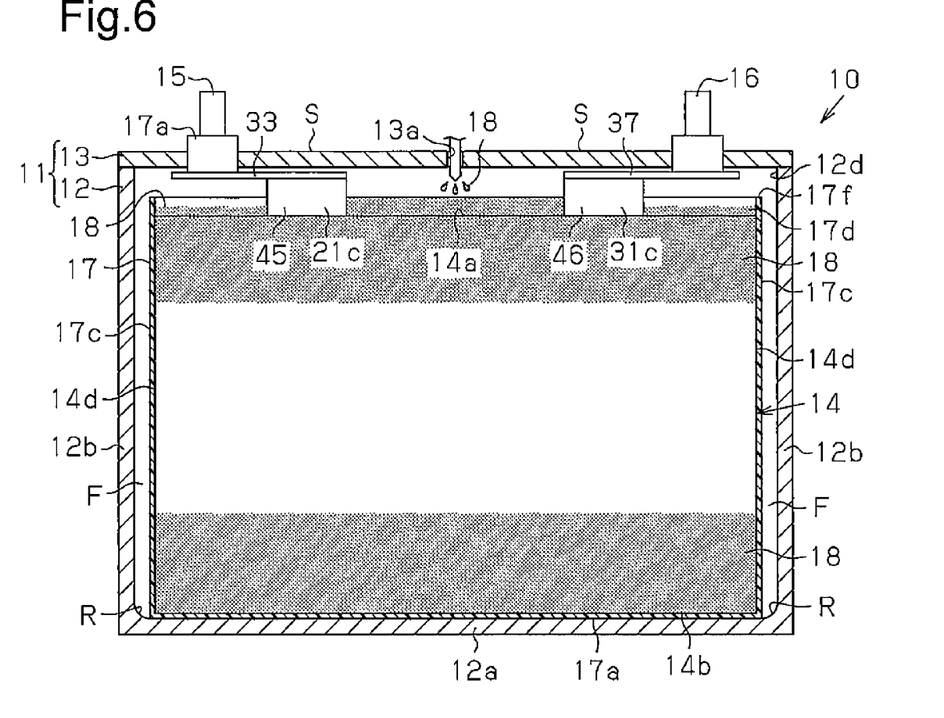
FIG. 6 is a cross-sectional view showing the rechargeable battery into which an electrolyte solution is introduced through an inlet.
Figure 7:
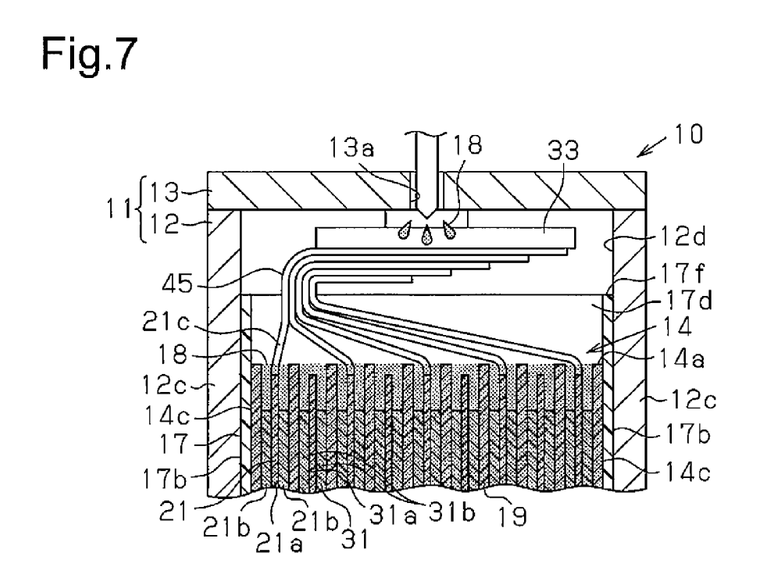
FIG. 7 is a cross-sectional view showing the rechargeable battery into which the electrolyte solution is introduced through the inlet.

As indicated by the dot hatch pattern in FIGS. 6 and 7, the electrolyte solution 18 is poured onto the region of the first surface 14a of the electrode assembly 14 that is located between the positive tab group 45 and the negative tab group 46. Some of the electrolyte solution 18 then flows along the first surface 14a of the electrode assembly 14 in all directions including the lamination direction. Here, the positive tab group 45 and the negative tab group 46, which contact the electrolyte solution 18, slow down the flows of the electrolyte solution 18 toward the transverse walls 12b. At the opposite sides in the lamination direction, the sections of the insulator 17 near the open end 17f temporarily retain the electrolyte solution 18. Consequently, the electrolyte solution 18 temporarily stays on the first surface 14a of the electrode assembly 14 and between the positive tab group 45 and the negative tab group 46.

The electrolyte solution 18 that does not stay on the first surface 14a flows through the gaps between the positive electrode sheets 21 and the negative electrode sheets 31, the gaps between the insulator 17 and the end surfaces 14c and the side surfaces 14d of the electrode assembly 14, and the gaps between the insulator 17 and the body 12 and accumulates on the bottom plate 12a. The electrolyte solution 18 on the first surface 14a of the electrode assembly 14 infiltrates the active materials of the positive and negative electrodes by capillary action and gravity. The electrolyte solution 18 on the second surface 14b infiltrates the active materials of the positive and negative electrodes by capillary action.

The rechargeable battery 10 is completed when the immersion of the active materials in the electrolyte solution 18 ends.

The above described embodiment has the following advantages.

(1) The positive tab group 45 and the negative tab group 46 allow the electrolyte solution 18 that has been introduced through the inlet 13a to temporarily stay on the first surface 14a of the electrode assembly 14. Thus, the active materials are immersed in the electrolyte solution 18 from both the first surface 14a and the second surface 14b of the electrode assembly 14. This shortens the time required to immerse the active materials in the electrolyte solution 18 compared to a structure in which the active materials are immersed in the electrolyte solution 18 only from the second surface 14b by capillary action against gravity.

(2) The insulator 17 includes the opening 17d, which exposes the entire first surface 14a of the electrode assembly 14 to the outside of the insulator 17. This ensures that the electrolyte solution 18, which is introduced into the case 11 through the inlet 13a, is placed and stays on the first surface 14a of the electrode assembly 14.

(3) The open end 17f of the insulator 17 is located above the first surface 14a of the electrode assembly 14. This enables the insulator 17 to temporarily retain the electrolyte solution 18, which is poured onto the first surface 14a of the electrode assembly 14, allowing the electrolyte solution 18 to stay on the entire first surface 14a of the electrode assembly 14.

(4) The insulator 17 is not placed on the curved sections R of the body 12, and the entire bottom covering section 17a of the insulator 17 is located on the bottom plate 12a. This forms the clearances F between the outer surfaces of the secondary covering sections 17c of the insulator 17 and the inner surfaces of the transverse walls 12b. The electrolyte solution 18 tends to flow into the clearances F, which reduces the electrolyte solution 18 that stays on the first surface 14a of the electrode assembly 14. However, despite the clearances F, the positive tab group 45 and the negative tab group 46, which slow down the flow of the electrolyte solution 18, enable the electrolyte solution 18 to stay on the first surface 14a of the electrode assembly 14.

(5) All the positive electrode sheets 21 each include a positive collector tab 21c, and all the positive collector tabs 21c are used to form the positive tab group 45. Further, all the negative electrode sheets 31 each include a negative collector tab 31c, and all the negative collector tabs 31c are used to form the negative tab group 46. Thus, the gaps between the positive collector tabs 21c in the positive tab group 45 and the gaps between the negative collector tabs 31c in the negative tab group 46 are narrow, ensuring that the electrolyte solution 18 flows slowly.

(6) The inlet 13a is spaced apart by equal distances from the two regions S, onto which the positive tab group 45 and the negative tab group 46 are projected. Thus, the electrolyte solution 18 is introduced into the midpoint between the positive tab group 45 and the negative tab group 46, which reduces unevenness of the electrolyte solution 18 on the first surface 14a. Consequently, the electrolyte solution 18 is substantially uniformly distributed from the first surface 14a of the electrode assembly 14 in all directions.

The above described embodiment may be modified as follows.

As long as the inlet 13a is located between the regions S in the lid 13, onto which the positive tab group 45 and the negative tab group 46 are projected, the inlet 13a may be shifted from the center in the longitudinal and transverse directions.

Figure 8:
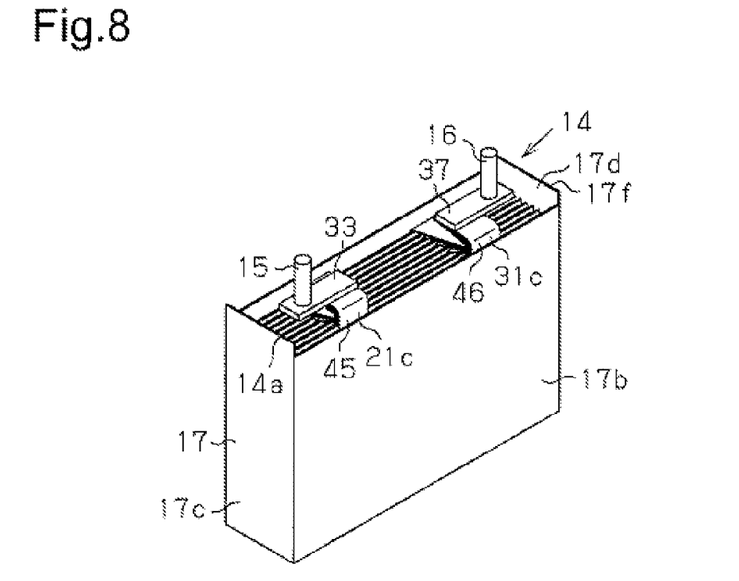
FIG. 8 is a perspective view showing a modification of an insulator.

As shown in FIG. 8, the secondary covering sections 17c of the insulator 17 according to the present embodiment may be extended in the direction in which the tabs 21c and 31c project from the first surface 14a of the electrode assembly 14 (direction perpendicular to the first surface 14a). Such secondary covering sections 17c prevent the electrolyte solution 18 from flowing into the clearances F between the outer surfaces of the secondary covering sections 17c and the inner surfaces of the transverse walls 12b, allowing the electrolyte solution 18 to stay on the first surface 14a of the electrode assembly 14.

Alternatively, only one of the two secondary covering sections 17c may be extended. Further, in addition to the secondary covering sections 17c, the primary covering sections 17b may be extended in the direction in which the tabs 21c and 31c project from the first surface 14a (direction perpendicular to the first surface 14a).

The open end 17f of the insulator 17 does not have to be located above the first surface 14a in the direction in which the positive collector tabs 21c and the negative collector tabs 31c project from the first surface 14a (direction perpendicular to the first surface 14a). The open end 17f may be located at the same level as the first surface 14a.

Not all the positive electrode sheets 21 need to include a positive collector tab 21c, and not all the negative electrode sheets 31 need to include a negative collector tab 31c.

In the above embodiment, the inlet 13a is formed in the lid 13, which serves as a wall of the case 11. However, the inlet 13a may be formed in a bottom plate 12a, a transverse wall 12b, or a longitudinal wall 12c of the body 12, which serves as a wall of the case 11. In this case, the electrode assembly 14 is inserted into the body 12 such that the first surface 14a of the electrode assembly 14 faces the bottom plate 12a, the transverse wall 12b, or the longitudinal wall 12c.

The number of the positive electrode sheets 21 and the negative electrode sheets 31, which form the electrode assembly 14, may be changed if necessary.

The positive active material layer 21b may be located only on one surface of positive metal foil 21a, and the negative active material layer 31b may be located only on one surface of negative metal foil 31a.

The electricity storage device may be a nickel metal hydride rechargeable battery.

The invention claimed is:

1. An electricity storage device comprising:
    an electrode assembly including a plurality of primary electrodes and a plurality of secondary electrodes, wherein the primary electrodes and the secondary electrodes are layered alternately in a lamination direction, the primary electrodes are insulated from the secondary electrodes, and each of the primary electrodes and the secondary electrodes includes metal foil and an active material layer that is located on at least one surface of the metal foil;
    a case that accommodates electrolyte solution and the electrode assembly and includes a wall that includes an inlet for the electrolyte solution; and
    an insulator that is located in the case and insulates the electrode assembly from the case, wherein
    the electrode assembly includes a facing surface that faces the wall of the case,
    at least some of the primary electrodes each include a primary tab that projects from one edge of the primary electrode to take out electricity from the primary electrode,
    at least some of the secondary electrodes each include a secondary tab that projects from one edge of the secondary electrode to take out electricity from the secondary electrode,
    the primary tabs are collected in the lamination direction to form a primary tab group on the facing surface of the electrode assembly,
    the secondary tabs are collected in the lamination direction to form a secondary tab group on the facing surface of the electrode assembly,
    the primary tab group and the secondary tab group each include a first side and a second side opposite to the first side,
    the primary tab group and the secondary tab group are spaced apart from each other in a direction that extends perpendicular to the lamination direction and along the facing surface of the electrode assembly,
    each of the primary tab group and the secondary tab group is bent such that the first side faces the facing surface of the electrode assembly and the second side faces the wall of the case,
    the insulator exposes the entire facing surface of the electrode assembly to an outside of the insulator,
    the inlet is located at a position between regions of the wall onto which the primary tab group and the secondary tab group are projected when the wall is viewed in a direction perpendicular to the facing surface of the electrode assembly,
    the insulator includes a plurality of covering sections, each of the covering sections covers one of surfaces of the electrode assembly that are perpendicular to the facing surface, and
    at least one of the covering sections extends beyond the facing surface of the electrode assembly in a direction perpendicular to the facing surface.

2. An electricity storage device comprising:
    an electrode assembly including a plurality of primary electrodes and a plurality of secondary electrodes, wherein the primary electrodes and the secondary electrodes are layered alternately in a lamination direction, the primary electrodes are insulated from the secondary electrodes, and each of the primary electrodes and the secondary electrodes includes metal foil and an active material layer that is located on at least one surface of the metal foil;
    a case that accommodates electrolyte solution and the electrode assembly and includes a wall that includes an inlet for the electrolyte solution; and
    an insulator that is located in the case and insulates the electrode assembly from the case, wherein
    the electrode assembly includes a facing surface that faces the wall of the case,
    at least some of the primary electrodes each include a primary tab that projects from one edge of the primary electrode to take out electricity from the primary electrode,
    at least some of the secondary electrodes each include a secondary tab that projects from one edge of the secondary electrode to take out electricity from the secondary electrode,
    the primary tabs are collected in the lamination direction to form a primary tab group on the facing surface of the electrode assembly,
    the secondary tabs are collected in the lamination direction to form a secondary tab group on the facing surface of the electrode assembly,
    the primary tab group and the secondary tab group each include a first side and a second side opposite to the first side,
    the primary tab group and the secondary tab group are spaced apart from each other in a direction that extends perpendicular to the lamination direction and along the facing surface of the electrode assembly, each of the primary tab group and the secondary tab group is bent such that the first side faces the facing surface of the electrode assembly and the second side faces the wall of the case, the insulator exposes the entire facing surface of the electrode assembly to an outside of the insulator, the inlet is located at a position between regions of the wall onto which the primary tab group and the secondary tab group are projected when the wall is viewed in a direction perpendicular to the facing surface of the electrode assembly, the electrode assembly includes two surfaces that are perpendicular to the facing surface and differ from two end surfaces in the lamination direction of the electrode assembly, the insulator includes a covering section that covers at least one of the two surfaces of the electrode assembly, and the covering section extends beyond the facing surface of the electrode assembly in a direction perpendicular to the facing surface.

3. The electricity storage device according to claim 1, wherein all the primary electrodes each include one of the primary tabs, the primary tab group includes all the primary tabs, all the secondary electrodes each include one of the secondary tabs, and the secondary tab group includes all the secondary tabs.

4. The electricity storage device according to claim 1, wherein the electricity storage device is a rechargeable battery.

5. The electricity storage device according to claim 2, wherein all the primary electrodes each include one of the primary tabs, the primary tab group includes all the primary tabs, all the secondary electrodes each include one of the secondary tabs, and the secondary tab group includes all the secondary tabs.

6. The electricity storage device according to claims 2, wherein the electricity storage device is a rechargeable battery.

* * * * *